Feb. 23, 1971  E. R. GIONET ET AL  3,565,477
CLOSURE LATCH
Filed June 18, 1969  2 Sheets-Sheet 1
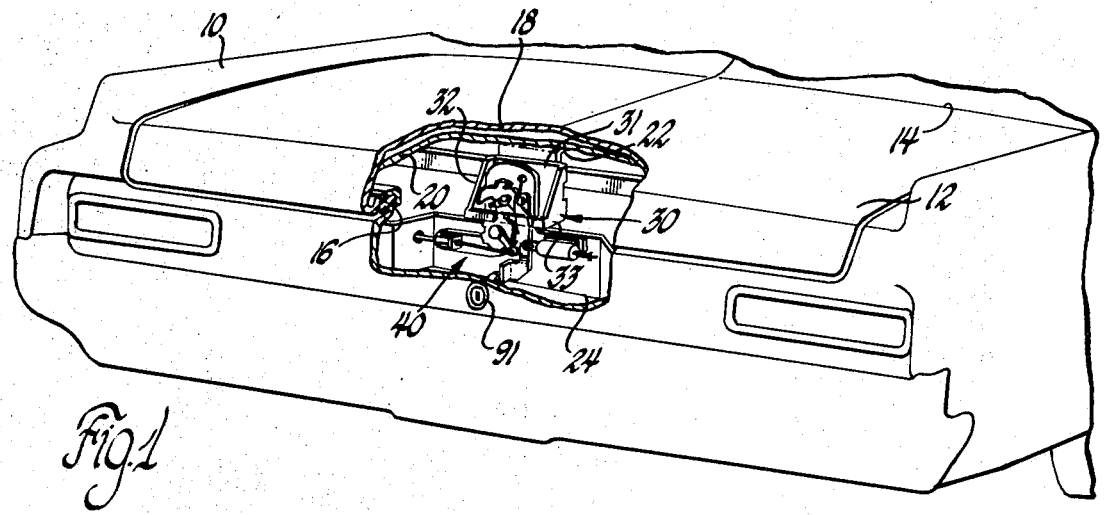
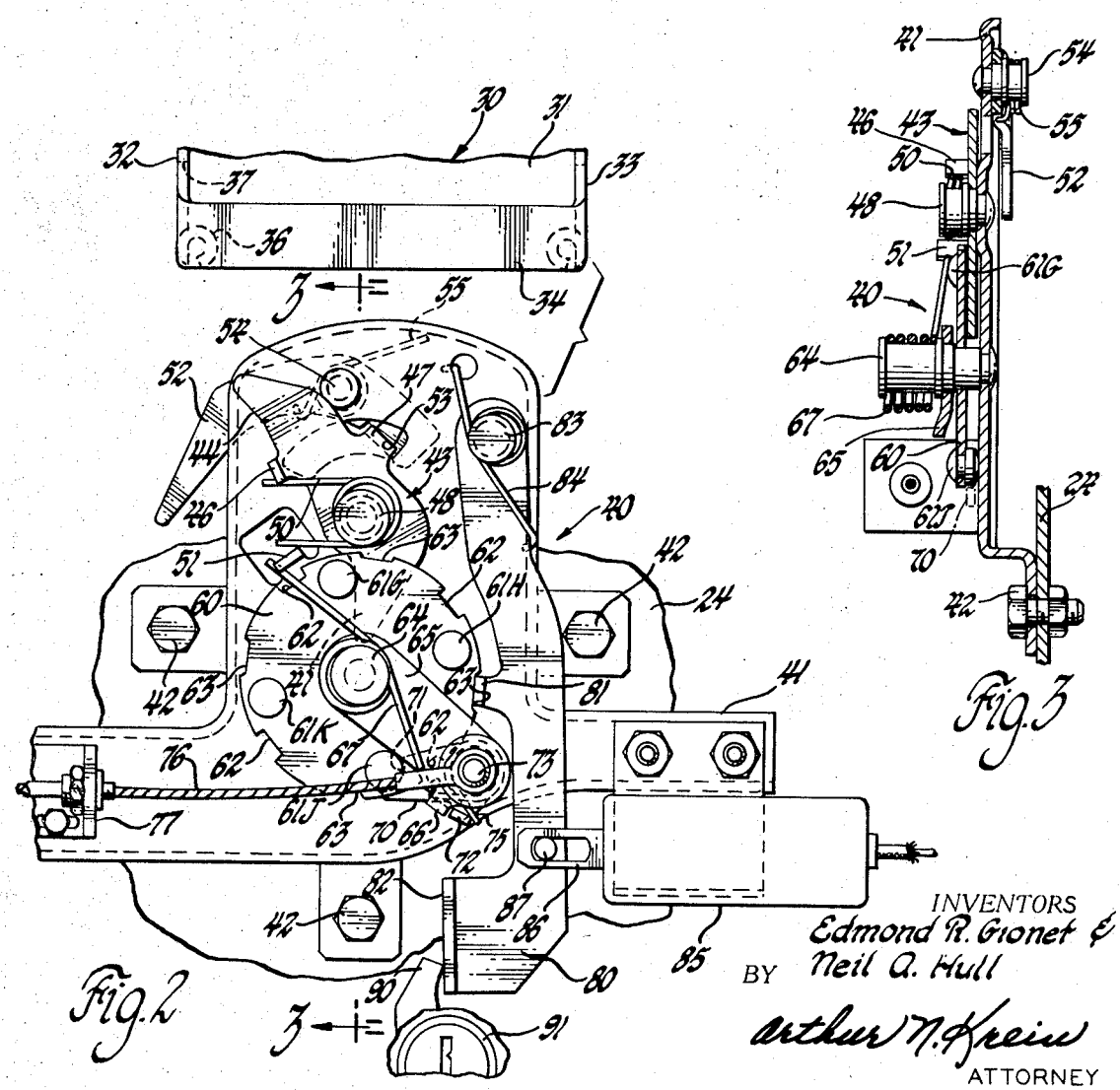
INVENTORS
Edmond R. Gionet &
BY Neil A. Hull
Arthur N. Krein
ATTORNEY INVENTORS
Edmond R. Gionet &
Neil A. Hull
BY
ATTORNEY

United States Patent Office 3,565,477
Patented Feb. 23, 1971

3,565,477
CLOSURE LATCH
Edmond R. Gionet, Warren, and Neil A. Hull, Birmingham, Mich., assignors to General Motors Corporation, Detroit, Mich., a corporation of Delaware
Filed June 18, 1969, Ser. No. 834,390
Int. Cl. E05b *63/20;* E05c *19/12*
U.S. Cl. 292—336                                6 Claims

ABSTRACT OF THE DISCLOSURE

A closure latch for a vehicle body or the like includes a pivotal latch bolt for engaging a fixed striker, the latch bolt being biased to a detent retained unlatched position and movable to a latched position by a power driven pin-tooth drive wheel. The latch bolt is releasably locked in the latch position by detent means engaging the pin-tooth drive wheel preventing further rotational movement of the pin-tooth drive wheel by the power means. Unlatching is effected by disengagement of the detent means from the pin-tooth drive wheel permitting further power driven rotation of the pin-tooth wheel to release the latch bolt and to position the pin-tooth drive wheel for another latching cycle.

---

This invention relates to closure latches and more particularly to a vehicle closure latch assembly that is power actuated during latching and unlatching.

In various applications of closure latches, for example, as used in connection with motor vehicle deck lids, it is desirable that the closure latch be capable of being power driven during the final closure and that deck the lid release be power assisted.

It is therefore the principal object of this invention to improve closure latch mechanisms for vehicle body deck lids in which a power source is used to move a closure from a partially open position to a fully closed and latched position and the same power means is used to effect unlatching of the deck lid.

Another object of this invention is to improve closure latch mechanisms to include a power assisted latch release mechanism operable selectively from either the interior or the exterior of the vehicle.

A further object of this invention is to improve closure latch mechanisms so that the closure latch mechanisms are economical to produce, simple to install and dependable in operation.

According to the embodiment of the invention disclosed these and other objects of the invention are achieved by providing a closure latch assembly for latching a closure member to a support member, the closure member being swingably mounted for movement between opened and closed positions relative to the support member. The closure latch assembly includes a striker fixed to one of the members and a latch assembly mounted to the other member. The latch assembly includes a generally hat-shaped frame, to receive the striker, with a latch bolt pivotally mounted thereon and normally biased in one direction to an unlatched position. A bolt release lever is pivotally mounted to the frame with one end holding the latch bolt in the unlatched position and the other end extending outwardly from the side of the frame to be tripped by the striker. A pin-tooth drive wheel is rotatably mounted to the frame in position whereby the latch bolt can be tripped by the pin-teeth of this drive wheel. The drive wheel is power driven through a lever and pawl assembly connected to a source of intermittent power whereby the drive wheel can be rotated a quarter of a turn during each latching and unlatching cycle. The rotation of the pin-tooth drive wheel is controlled by a biased detent which is pivotally connected to the frame, the biased detent having a detent tab thereon for engaging suitable detent notches in the periphery of the pin-tooth drive wheel. The free end of the detent is connected to a solenoid and connectable to a key cylinder assembly for pivoting the detent away from the pin-tooth drive wheel allowing the drive wheel to turn until the detent tab on the detent stops the wheel by dropping into the next detent notch on the drive wheel.

For a better understanding of the invention, as well as other objects and further features thereof, reference is had to the following detailed description of the invention to be read in connection with the accompanying drawings, wherein:

FIG. 1 is a partially broken away fragmentary perspective view of a vehicle having a closure latch constructed in accordance with the invention secured thereon;

FIG. 2 is an enlarged view of a portion of FIG. 1 showing the closure latch of the invention in an unlatched condition ready for a latching cycle;

FIG. 3 is a sectional view taken along line 3—3 of FIG. 2;

Figure 4:
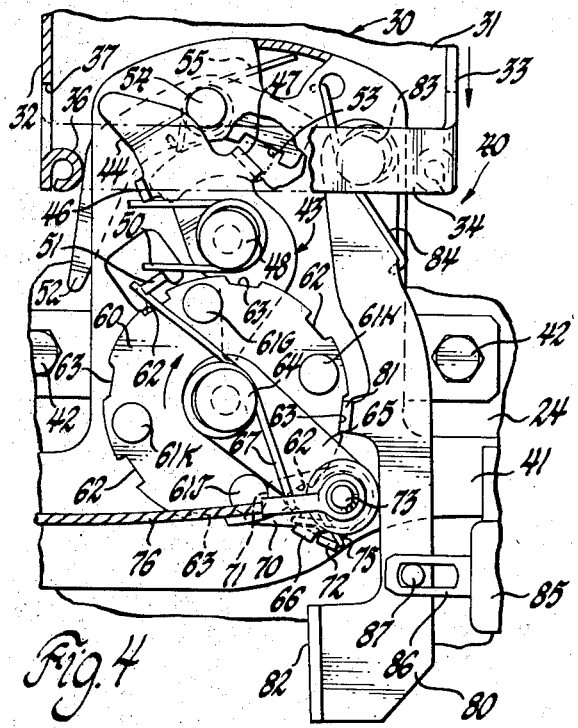
FIG. 4 is a view similar to FIG. 2 illustrating the latch bolt released and ready for the beginning of a latch pull down cycle.

Referring now particularly to FIG. 1 of the drawings, a vehicle body 10 includes a deck lid 12 hingedly mounted adjacent its forward edge 14 for swinging movement between an open position, not shown, to a closed position, as shown. Preferably, the deck lid is swingably mounted by spaced, counterbalanced hinges, one of which has connected thereto an energy storage device of the type disclosed in U.S. Pat. 3,056,619 granted to Robert M. Fox and James D. Leslie on Oct. 2, 1962, the energy storage device being operative to store operating energy as the deck lid moves from a fully open position to the closed position. When in its closed position, deck lid 12 engages and compresses a seal strip 16 extending substantially around the perimeter of the deck opening as is well known in the art. The deck lid 12 includes an outer panel 18 and an inner panel 20 suitably secured together at their rear portions, the inner panel 20 having a back plate 22 suitably secured thereto to provide support for a striker 30, while another back plate 24 is secured to the vehicle body 10 to provide a support for the latch assembly, generally designated 40, in operative relation to the striker 30. The striker 30 and latch assembly 40 are the main sub-assemblies of the closure latch mechanism of the invention.

Striker 30 of conventional configuration is formed similar to an open ended box with front wall 31, side walls 32 and 33, and partial rear wall 34 formed integral with each to provide an elongated latch opening. The left hand side wall 32, as seen in FIG. 4, is suitably pierced with the metal deformed to provide a flanged striker edge portion 36 while providing a bolt aperture 37 therein. The right hand side wall 33 is constructed in a similar manner.

The latch assembly 40 includes a frame 41 for supporting the remaining components of this assembly and by means of which this assembly can be secured to the back plate 24 by bolts 42. The frame 41 is generally hat-shaped to receive the striker 30 mounted on the deck lid 12. A latch bolt 43 is pivotally mounted intermediate its ends by headed stud 48 to frame 41 for movement between a latched position in the closed position of deck lid 12, as shown in FIG. 5, wherein the hooked end 44 of the latch bolt is received within the bolt aperture 37 and embraces the flanged striker portion 36 of striker 30, to an unlatched position wherein the hooked end is disengaged from the flanged striker portion 36, that is, in the unlatched position shown in FIG. 2.

The latch bolt 43 is normally biased in a clockwise direction as seen in FIG. 2 to the unlatched position by coiled torsion spring 50 encircling headed stud 48 with one leg of the spring engaging a turned tab 51 on frame 41 and the other leg engaging tab 46 of latch bolt 43. To hold the latch bolt in the unlatched position, a detent tab 47 thereon is engaged by detent notch 53 of a bolt release lever 52 pivotally supported to the frame 41 by means of a headed stud 54. The bolt release lever 52 has one end thereof extending beyond the side of the frame 41 in position to be engaged by the striker to effect rotational movement of the bolt release lever in a counterclockwise direction as seen in FIG. 2. The bolt release lever 52 is normally biased in a clockwise direction by means of a coiled torsion spring 55 encircling the headed stud 54 with one leg thereof being hooked over the bolt release lever and the other leg engaging a turned over flange portion of frame 41.

Figure 5:
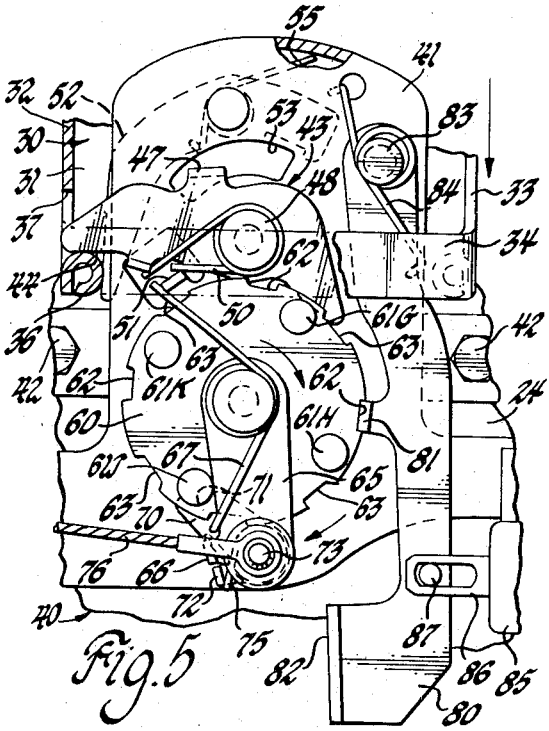
FIG. 5 is a view similar to FIG. 2 with the latch bolt in a full pull down latched and locked position.

To effect latching engagement of the latch bolt 43 with striker 30, it is rotated in a counterclockwise direction, as seen in FIG. 4, to the latched position of FIG. 5 by an intermittent motion device, such as a ratchet gearing mechanism. In the embodiment shown, the intermittent motion device consists of a drive wheel 60, in the form of a pin-tooth wheel, a lever arm 65 and biased pawl 70 driven by a suitable source of intermittent pulling power such as an energy storage device, not shown, of the type disclosed in the previously identified U.S. Pat. 3,056,619 granted to Robert M. Fox and James D. Leslie on Oct. 2, 1962.

The drive wheel 60 in the form of a pin-tooth wheel with at least two drive pins for a purpose which will become apparent, has in the embodiment shown, four equally spaced pin-teeth in the form of pins 61–G, 61–H, 61–J and 61–K extending axially from the face of the drive wheel for sequential driven engagement by the pawl 70 and driving engagement with the follower portion 45 of the latch bolt, as described hereinafter. Drive wheel 60 is also provided with four equally spaced detent stop notches 62 around its periphery and intermediate these there is provided a set of four equally spaced notches 63 with at least the trailing edge portion of each notch, in terms of the direction of rotation of the drive wheel, having a cam surface whereby the detent lever to be described can be overridden by forced rotation of the drive wheel. Whether two or more pins are used on the drive wheel, the number of notches 62 should correspond to the number of pins.

The lever arm 65 is pivotally secured at one end together with the drive wheel 60 to the frame 41 by means of a headed pivot stud 64. A coiled torsion spring 67 encircles this headed stud 64 and has one leg engaging tab 51 of frame 41 and the other leg engaging lever arm 65 to normally bias the lever arm in a counterclockwise direction as seen in FIGS. 2 through 7, inclusive.

The opposite end of lever arm 65 is pivotally secured to pawl 70 by means of shoulder drive stud 73. Coiled torsion spring 75 encircles this shoulder drive stud 73 between the pawl 70 and the lever arm 65 and has one leg engaging a tab 66 on lever arm 65 and the other leg engaging a tab 72 on pawl 70 to normally bias the pawl in a clockwise direction, as seen in FIG. 2, whereby the drive foot portion 71 of the pawl is biased into driving engagement with a pin on the drive wheel 60. The shoulder drive stud 73 has one end of pull cable 76 connected to it, the opposite end of the pull cable extending through an apertured cable support guide 77 adjustably secured to frame 41 and is connected to an energy storage device of the type disclosed in the previously referenced U.S. Pat. 3,056,619.

Figure 6:
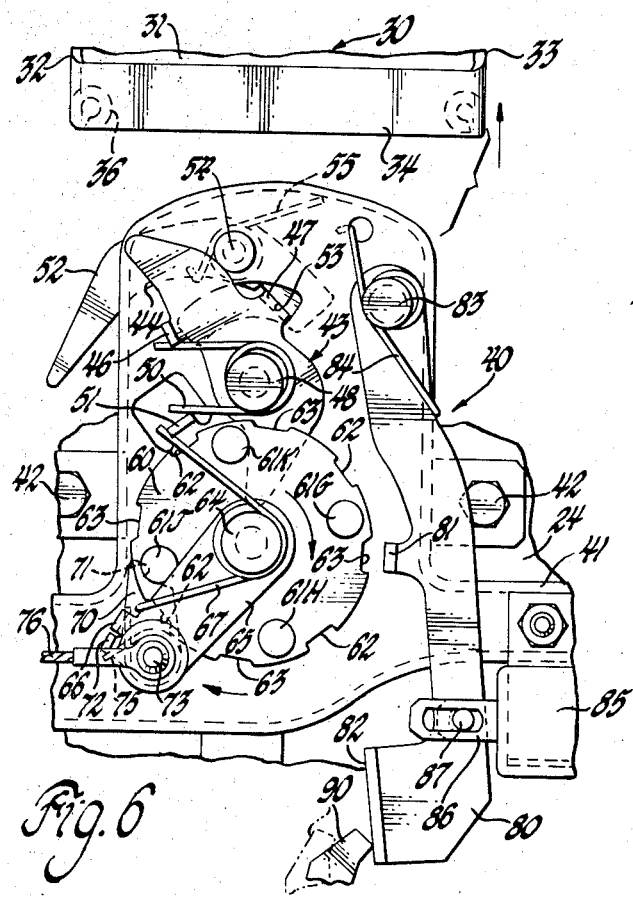
FIG. 6 is a view similar to FIG. 2 showing the detent lever in latch releasing position allowing movement of the pin-tooth drive wheel to effect unlatching of the deck lid.

With this arrangement, the lever arm 65 swings about the center of drive wheel 60, through a fractional part of a revolution, as indicated by the positions of the lever arm 65 in FIGS. 2 and 6, which represent its extreme positions. When the movement of the lever arm is in a clockwise direction as seen in FIG. 4, the pawl 70 engages a pin on the drive wheel so that the latter turns with the lever arm. When the lever arm swings in the opposite direction, the pawl slides over the next tooth without transmitting motion to the drive wheel. In the embodiment shown in which the drive wheel is provided with four pins, the drive wheel is rotated a quarter of a turn during each operating cycle.

The rotation of the drive wheel 60 is controlled by a detent lever 80 pivotally journaled at one end by headed stud 83 secured to frame 41 and is normally biased in a clockwise direction as seen in FIG. 2, whereby the detent tab 81 thereon will contact drive wheel 60 for engagement with detent stop notches 62 or detent notches 63 on the periphery thereof, by means of a coiled torsion spring 84 which encircles the headed stud 83 with one leg of this spring engaging an apertured portion of frame 41 and the other leg hooked over the detent lever 80.

Counterclockwise pivotal movement of the detent lever to pull it out of engagement with the drive wheel 60 is accomplished either manually or by a suitable power source such as solenoid 85 mounted on frame 41 and connected by a switch, not shown, which may be mounted on the dash of the vehicle to a suitable source of electrical power, such as the vehicle power battery, not shown. A pin 87 secured to the free end of detent lever 80 extends through the slotted portion of armature 86 of the solenoid 85. As is conventional, energizing the solenoid 85 will effect a retraction of the armature 86 effecting pivotal movement of the detent lever in a counterclockwise direction as seen in FIG. 6. Manual actuation of the detent lever 80 is done by cam 90 suitably journaled adjacent to the free end of the detent lever for contact with cam follower portion 82 thereon. The cam 96 is provided with a square-shaped bore which receives the complementary-shaped end of a shaft, not shown, which is part of a key cylinder assembly 91 mounted to the vehicle body 10. The key cylinder assembly 91 is of a known type and upon insertion of a key therein, the shaft can be turned to in turn rotate cam 90.

Referring now particularly to FIGS. 2, 4, 5, 6 and 7, the operation of the closure latch will be described and, particularly, the relationship of the various elements to each other during the operation of the closure latch through one complete operating cycle. As shown in FIG. 2, the closure latch is in an unlatched position with the latch bolt 43 held in an unlocked position by bolt release lever 52. With the latch bolt thus restrained against rotational movement, the drive wheel 60 is prevented from rotating in a clockwise direction by engagement of pin 61–G against the follower portion 45 of latch bolt 43. In addition, the detent tab 81 of detent lever 80 is biased into engagement with a detent notch 63 of the drive wheel 60, it being assumed that the solenoid 85 is in a de-energized condition and that the key cylinder assembly 91 is in a locked condition. The detent notches 63 are provided primarily to retain the drive wheel from rotation in a counterclockwise direction as the lever arm 65 is being returned from the position shown in FIG. 6 to the position in FIG. 7. Forced clockwise rotation of the drive wheel will cause it to override the detent lever by the cam action of the trailing edge of these notches against the detent tab 81 of the detent lever.

Assuming that the deck lid is in a fully open position, when the operator begins to close the deck lid, energy will begin to be stored in the energy storage device, not shown, to arm it for pulling the pull cable 76 to the left as seen in FIG. 2. Although energy is being stored in the energy storage device at this time, it cannot be used to effect rotation of the drive wheel 60 at this time because the drive wheel is being restrained against rotational movement by the engagement of pin 61-G against the latch bolt 43 as described above.

When the deck lid is lowered further to a substantially closed, but not fully closed, position, as seen in FIG. 4, the flanged striker portion 36 of striker 30 will engage the bolt release lever 52 rotating it in a counterclockwise direction to effect disengagement of the detent tab 47 of latch bolt 43 from the detent notch 53 on the bolt release lever 52. The latch bolt 43 is now free to be rotated and this release of the latch bolt now allows the energy storage device to pull the pull cable 76 to rotate the lever arm 65 and, through the engagement of the pawl 70 with the pin 61-J, effect rotational movement of the drive wheel 60 bringing the pin 61-G into contact with the follower portion 45 of the latch bolt 43 rotating it in a counterclockwise direction. As the latch bolt is rotated, its hooked end 44 extends through bolt aperture 37 to engage the flanged striker portion 36 of striker 30 forcing it downward thereby pulling the deck lid to a fully closed position, as shown in FIG. 5. As the latch bolt 43 was released for counterclockwise rotation, the drive wheel 60 was free for rotational movement in a clockwise direction except for the engagement of detent tab 81 of detent lever 80 with the detent notch 63 on the drive wheel. However, the clockwise biasing force of spring 84 on the detent lever 80 is such as to permit movement of this detent lever in a counterclockwise direction by the force effected through the cam portion of the detent notch 63 of the drive wheel acting against the detent tab 81 of the detent lever 80, This, of course, is the reason that the four detent notches 63 on the drive wheel 60 have the cam side edges to permit the detent lever to be forced out of engagement with the drive wheel simply by rotation of the drive wheel in a clockwise direction. The detent lever is free to move in a counterclockwise direction by means of the lost motion slot in the armature 86 of solenoid 85. Further rotational movement of the drive wheel 60 will then bring a detent notch 62 thereon into position to be engaged by the detent tab 81 of the detent lever 80 whereby the drive wheel is held against further rotational movement, thereby, in effect, locking the latch bolt in a latched position as shown in FIG. 5.

Unlatching is achieved by a counterclockwise rotation of the detent lever 80 by either actuation of the solenoid 85 or key cylinder assembly 91. Actuation of the solenoid 85 through a suitable switch, not shown, will draw the armature 86 to the right as seen in FIG. 6 engaging the pin 87 on the detent lever 80 causing it to rotate in a counterclockwise direction. In a similar manner, turning the key, not shown, in the key cylinder assembly 91 will effect clockwise direction of cam 90 causing it to engage the detent lever and to rotate it in a counterclockwise direction pulling it out of engagement with the drive wheel as seen in FIG. 6. As the drive wheel is thus released, it is free to be rotated further in a clockwise direction by means of the toggle link which is still engaging pin 61-J causing pin 61-G to slide off the follower portion 45 of the latch bolt 43, while advancing pin 61-K toward engagement with the latch bolt for the start of a new latching cycle.

Figure 7:
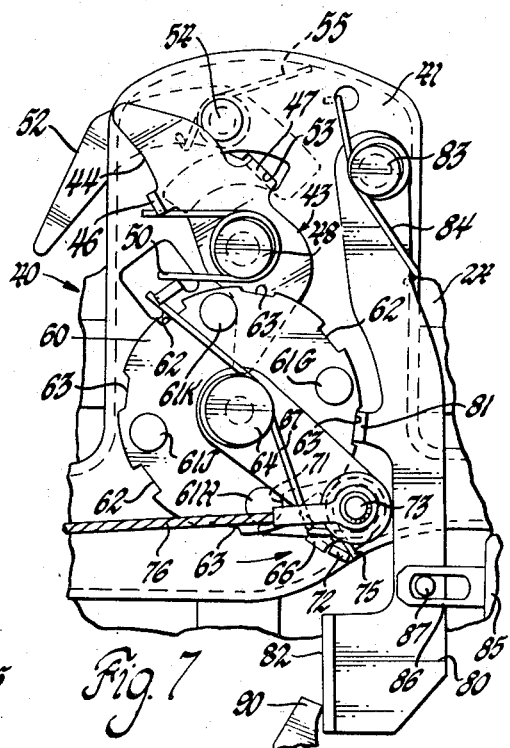
FIG. 7 is a view similar to FIG. 2 with the latch bolt again in an unlatched position ready for a new latching cycle.

As pin 61-G slides past the end of the latch bolt 43, the latch bolt is free to return to the unlatched position, that is, to rotate in a clockwise direction, via the biasing action of coiled torsion spring 50, thereby becoming unlatched from striker 30 allowing the deck lid to move upward under the influence of the conventional counterbalanced spring hinges. The deck lid is now free to be moved by the operator to the fully open position. As the deck lid is moved, the energy storage device is deactuated, releasing the pull on pull cable 76 whereby the lever arm is free to be rotated in a counterclockwise direction to its original position by coiled torsion spring 67, the pawl 70 riding over pin 61-H during this return movement of the lever arm 65. The counterclockwise rotation of lever arm 65 can be limited either by having the lever arm engage a suitable stop on the frame 41, by a suitable stop on detent lever 80 or, as shown, by limiting the movement of the pull cable 76 to the right as seen in FIG. 7 by means of the adjustable cable support 77. As seen in this figure, the latch bolt is now again retained in an unlatched position by bolt release lever 13 having its notch engaged by the detent tab of the latch bolt. The pin 61-K of drive wheel 60 is now in position to engage the latch bolt to effect its rotational movement during the next latching cycle while the pin 61-H is now in position to be driven by the pawl 70 during the next operating cycle.

While the invention has been described with reference to the structures disclosed herein, it is not confined to the details set forth and this application is intended to cover such modifications or changes as may come within the purposes of the improvements or the scope of the following claims.

What is claimed is:

1. A closure latch mechanism for latching a closure member to a support member, the closure member being swingably mounted for movement between open and closed positions relative to the support member and connected to an energy storage device operable to store operating energy as the closure member is moved from the open position to the closed position, the closure latch mechanism including a striker fixed to one of said members,
   a latch bolt pivotally mounted on said other member for movement between an unlatched position and a latched position in relation to said striker,
   means to normally bias said latch bolt to said unlatched position,
   biased lever detent means swingably mounted on said other member for normally holding said latch bolt in said unlatched position and positioned to be engaged by said striker for release of said latch bolt,
   intermittent motion means connected to and driven by the said energy storage device, said intermittent motion means being mounted for engagement with said latch bolt to pivot said latch bolt to said latched position,
   detent means positioned to engage said intermittent motion means to releasably lock said intermittent motion means when said latch bolt is in the latched position, and
   detent release means positioned to engage said detent means to release said detent means from said intermittent motion means.

2. A closure latch mechanism according to claim 1 wherein said intermittent motion means includes
   a rotatable pin-tooth drive wheel,
   a lever arm swingable relative to said pin-tooth drive wheel and connected to said energy storage device, and
   biased pawl means pivotally mounted on said lever arm for engagement with said pin-tooth drive wheel,
   said pin-tooth drive wheel having at least two pins thereon whereby as one of said pins is driven by said biased pawl means the other of said pins is in position to drive said latch bolt.

3. A closure latch mechanism according to claim 1 wherein said intermittent motion means includes
   a drive wheel having spaced detent notches on the periphery thereof and four axially extending spaced pin-teeth, said drive wheel being rotatably supported adjacent said latch bolt in position for sequential engagement of said pin-teeth with said latch bolt,
   a biased lever arm swingably mounted relative to said drive wheel and connected to said energy storage device, and
   biased pawl means pivotally mounted on said biased lever arm for movement therewith and for sequential engagement with said pin-teeth of said drive wheel.

4. A closure latch mechanism according to claim 3 wherein said detent notches on said drive wheel include
four equally spaced detent stop notches for engagement by said detent means, and
four notches having a cam surface trailing edge portion, in terms of the direction of rotation of said drive wheel, equally spaced intermediate said detent stop notches for overrideable engagement by said detent means,
said detent stop notches being positioned on said drive wheel relative to said pin-teeth for engagement by said detent means to stop the rotational movement of said drive wheel after a predetermined rotational movement of said drive wheel to effect movement of said latch bolt to said latched position whereby said latch bolt is retainable in said latched position.

5. A closure latch mechanism for latching a closure member to a support member, the closure member being swingably mounted for movement between open and closed positions relative to the support member, the closure latch mechanism including
a striker fixed to one of said members,
a latch bolt pivotally mounted on said other member for movement between an unlatched position and a latched position relative to said striker,
means to normally bias said latch bolt to said unlatched position,
a bolt release lever pivotally mounted adjacent said latch bolt for normally holding said latch bolt in said unlatched position and movable by contact with said striker to release said latch bolt,
a pin-tooth drive wheel rotatably journalled adjacent said latch bolt for sequential engagement with said latch bolt to pivot said latch bolt to said latched position,
biased lever and pawl means positioned to intermittently drive said pin-tooth drive wheel, said biased lever and pawl means being connectable to a source of intermittent power,
detent means positioned to engage said pin-tooth drive wheel to control the rotational movement of said pin-tooth drive wheel, and
detent release means positioned to effect release of said detent means relative to said pin-tooth drive wheel.

6. A closure latch mechanism for latching a closure member to a support member, the closure member being swingably mounted for movement between open and closed positions relative to the support member, the closure latch mechanism including
a striker fixed to one of said members,
a latch bolt pivotally mounted on said other member for movement between an unlatched position and a latched position relative to said striker,
means to normally bias said latch bolt to said unlatched position,
a bolt release lever pivotally mounted adjacent said latch bolt for normally holding said latch bolt in said unlatched position and movable by contact with said striker to release said latch bolt,
a drive wheel, having spaced detent notches on the periphery thereof and four axially extending spaced pin-teeth, rotatably supported adjacent said latch bolt in position for sequential engagement of said pin-teeth with said latch bolt,
biased lever and pawl means positioned to intermittently drive said pin-tooth drive wheel, said biased lever and pawl means being connectable to a source of intermittent power,
detent means positioned to engage said pin-tooth drive wheel to control the rotational movement of said pin-tooth drive wheel, and
detent release means positioned to effect release of said detent means relative to said drive wheel,
said detent notches on said drive wheel including
four equally spaced detent stop notches for engagement by said detent means, and
four notches having a cam surface trailing edge portion, in terms of the direction of rotation of said drive wheel, equally spaced intermediate said detent stop notches for overrideable engagement by said detent means,
said detent stop notches being positioned on said drive wheel relative to said pin-teeth for engagement by said detent means to stop the rotational movement of said drive wheel after a predetermined rotational movement of said drive wheel to effect movement of said latch bolt to said latched position whereby said latch bolt is retainable in said latched position.

References Cited

UNITED STATES PATENTS

| | | | |
|---|---|---|---|
| 2,286,740 | 6/1942 | Krause | 292—336 |
| 2,680,639 | 6/1954 | Vigmostad | 292—99 |
| 2,806,727 | 9/1957 | Johnstone | 292—216 |
| 2,898,138 | 8/1959 | Van Noord | 292—122 |
| 3,047,326 | 7/1962 | Leslie | 292—341.15 |
| 3,056,619 | 10/1962 | Fox | 292—341.15 |
| 3,378,291 | 4/1968 | Brian | 292—68 |

MARVIN A. CHAMPION, Primary Examiner

R. L. WOLFE, Assistant Examiner

U.S. Cl. X.R.

70—240; 292—198, 229, 304